(12) United States Patent
Belsom

(10) Patent No.: US 7,631,504 B2
(45) Date of Patent: Dec. 15, 2009

(54) METHODS AND APPARATUS FOR ASSEMBLING GAS TURBINE ENGINES

(75) Inventor: Keith Cletus Belsom, Laurens, SC (US)

(73) Assignee: General Electric Company, Schenectady, NY (US)

( * ) Notice: Subject to any disclaimer, the term of this patent is extended or adjusted under 35 U.S.C. 154(b) by 530 days.

(21) Appl. No.: 11/358,763

(22) Filed: Feb. 21, 2006

(65) Prior Publication Data

US 2007/0193274 A1 Aug. 23, 2007

(51) Int. Cl.
*F02C 9/00* (2006.01)
*F02C 9/16* (2006.01)
*F23R 3/54* (2006.01)

(52) U.S. Cl. .................... 60/772; 60/39.23; 60/794; 60/752; 60/760

(58) Field of Classification Search .............. 60/772, 60/773, 39.37, 752, 760, 39.23, 794
See application file for complete search history.

(56) References Cited

U.S. PATENT DOCUMENTS

| | | | | |
|---|---|---|---|---|
| 2,517,822 A | * | 8/1950 | Anderson | ............ 60/39.76 |
| 4,202,170 A | * | 5/1980 | Meyer | ............... 60/39.23 |
| 4,255,927 A | | 3/1981 | Johnson et al. | |
| 4,288,980 A | * | 9/1981 | Ernst | ................. 60/39.23 |
| 4,297,842 A | | 11/1981 | Gerhold et al. | |
| 4,719,748 A | * | 1/1988 | Davis et al. | ............... 60/39.37 |
| 4,944,149 A | | 7/1990 | Kuwata | |
| 5,351,474 A | | 10/1994 | Slocum et al. | |
| 5,548,951 A | * | 8/1996 | Mumford et al. | ......... 60/39.23 |
| 5,557,920 A | * | 9/1996 | Kain | ................... 60/39.23 |
| 5,715,764 A | | 2/1998 | Lyngfelt et al. | |
| 6,453,830 B1 | | 9/2002 | Zauderer | |
| 6,758,045 B2 | | 7/2004 | Dimov et al. | |
| 6,959,654 B2 | | 11/2005 | Abrams | |
| 2005/0034444 A1 | * | 2/2005 | Sanders | ............. 60/39.23 |

* cited by examiner

*Primary Examiner*—Ted Kim
(74) *Attorney, Agent, or Firm*—Armstrong Teasdale LLP

(57) ABSTRACT

A combustor assembly is provided. The combustor assembly includes a combustion chamber and at least one transition portion extending downstream from the combustion chamber to facilitate channeling combustion gases from the combustor assembly. The assembly also includes at least one air control system coupled to the at least one transition portion. The air control system including at least one biasing mechanism coupled to a controller to facilitate reducing emissions from the combustor assembly operation.

20 Claims, 5 Drawing Sheets

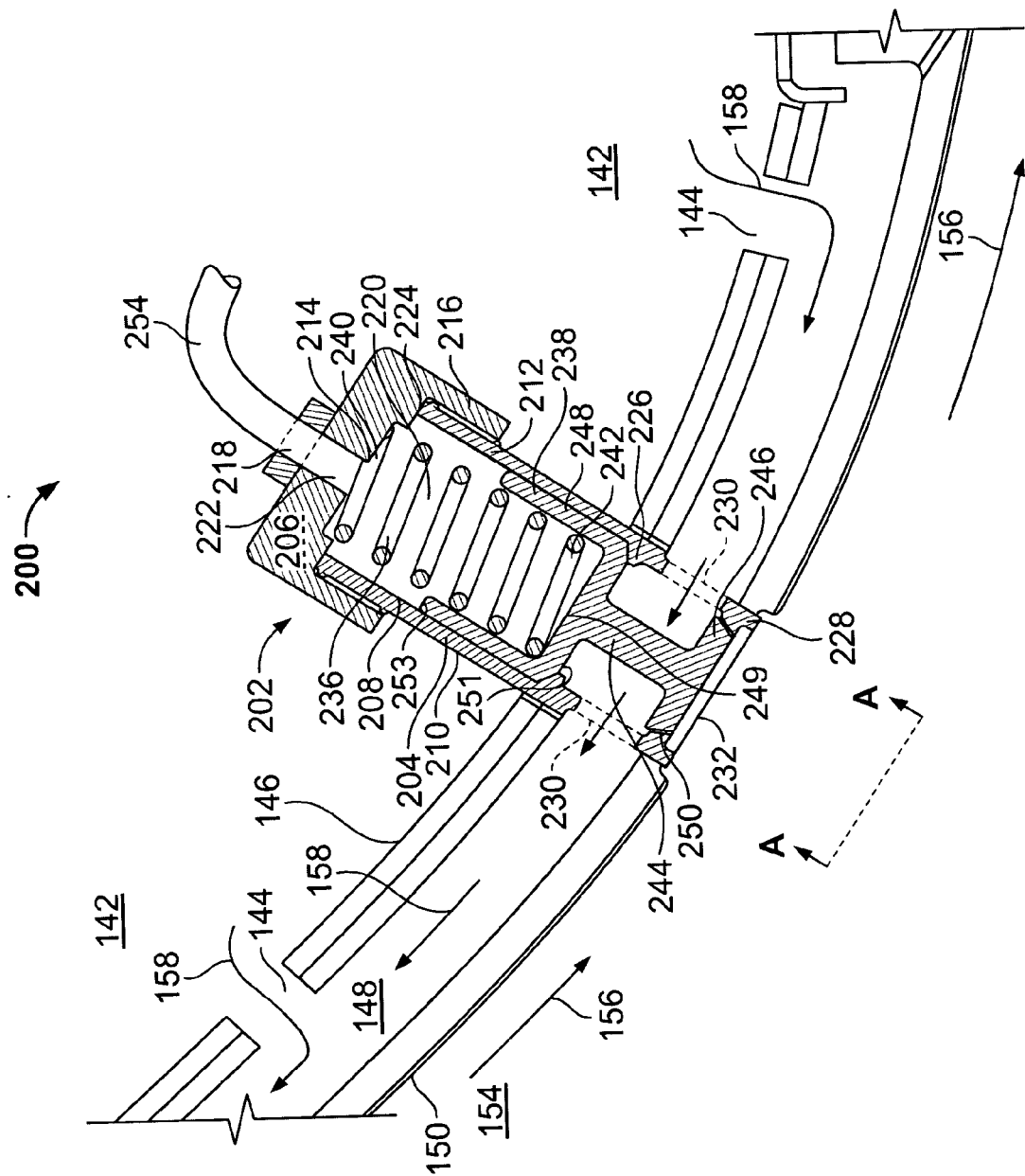

METHODS AND APPARATUS FOR ASSEMBLING GAS TURBINE ENGINES

BACKGROUND OF THE INVENTION

This invention relates generally to gas turbine engines and more particularly, to combustors for use with gas turbine engines.

At least some known gas turbine engines ignite and combust a fuel and air mixture to release heat energy from the fuel in an exothermic reaction to form a high temperature combustion gas stream. At least one by-product of the combustion reaction may be subject to regulatory limitations. For example, within thermally-driven reactions, nitrogen oxide ($NO_x$) may be formed by a reaction between nitrogen and oxygen in the air initiated by the high temperatures within the gas turbine engine. Generally, engine efficiency increases as the combustion gas stream temperature entering a turbine section of the engine increases. However, increasing the combustion gas temperature may facilitate an increased formation of $NO_x$.

Combustion normally occurs at or near an upstream region of a combustor that is normally referred to as the reaction zone or the primary zone. Additional mixing and combusting of fuel and air may occur downstream of the reaction zone in a region often referred to as a dilution zone. Air may be introduced directly into the dilution zone to dilute the fuel and air mixture to facilitate achieving a predetermined temperature of the gas stream entering the turbine section.

To facilitate controlling (including decreasing) $NO_x$ emissions during turbine engine operation, at least some known gas turbine engines use annular combustors that operate with a lean fuel/air ratio, i.e., the combustors are operated in a manner wherein fuel is premixed with air prior to admission into the combustor's reaction zone. The operable range of the engine using premixed fuel and air at certain fuel/air ratios may be limited. This is due to a particular premixed fuel/air ratio within a certain range of combustion operations may not facilitate a similar flame stability within other ranges. For example, at least some known engines operate primarily with premix flame conditions over a predetermined portion of the engine's operating range. While operating outside of this range, diffusion combustion, wherein the air and fuel are mixed within the associated combustion region, is often used to supplement and/or replace premix combustion. Diffusion combustion may have a tendency to increase the potential for $NO_x$ formation. Therefore, at least some of these known engines that operate with a lean premixed combustion reaction divert a portion of the combustion supply air to the dilution region downstream from the reaction zone and into the gas stream for improved ignition and operation of the engine within operating ranges other than those that exhibit a predetermined flame stability using premixed combustion exclusively. This method is sometimes referred to as "bypassing" since some air bypasses the combustion reaction. Within such engines the fuel/air ratio is generally not constant over the rated range of combustion operation of the engine. For example, a fuel/air ratio that facilitates reducing combustion reaction temperatures during normal engine operations may not be sufficient during start-up or lower power operations of the gas turbine engine.

BRIEF DESCRIPTION OF THE INVENTION

In one aspect, a method of assembling a gas turbine engine including at least one combustor is provided. The method includes providing at least one air control system. The air control system includes at least one biasing mechanism coupled to a control mechanism. The method also includes coupling the air control system to at least one combustor to facilitate combustion during engine operation.

In another aspect, a combustor assembly is provided. The combustor assembly includes a combustion chamber and at least one transition portion extending downstream from the combustion chamber. The transition portion facilitates channeling combustion gases from the combustor assembly. The assembly also includes at least one air control system coupled to the at least one transition portion. The air control system includes at least one biasing mechanism coupled to a controller to facilitate reducing emissions from the combustor assembly during operation.

In a further aspect, a gas turbine engine is provided. The engine includes a compressor and at least one combustor assembly downstream from the compressor. The combustor assembly includes a combustion chamber and at least one transition portion downstream from the compressor. The transition portion facilitates channeling combustion gases from the combustor assembly. The combustor assembly also includes at least one air control system coupled to the at least one transition portion. The air control system includes at least one biasing mechanism coupled to a controller to facilitate reducing emissions formation during combustor assembly operation.

BRIEF DESCRIPTION OF THE DRAWINGS

FIG. 4 is an enlarged cross-sectional illustration of an exemplary air staging system that may be used with the combustor assembly shown in FIGS. 2 and 3;

FIG. 5 is a cross-sectional illustration of a portion of the air staging system taken along Line A-A shown in FIG. 4.

DETAILED DESCRIPTION OF THE INVENTION

Figure 1:
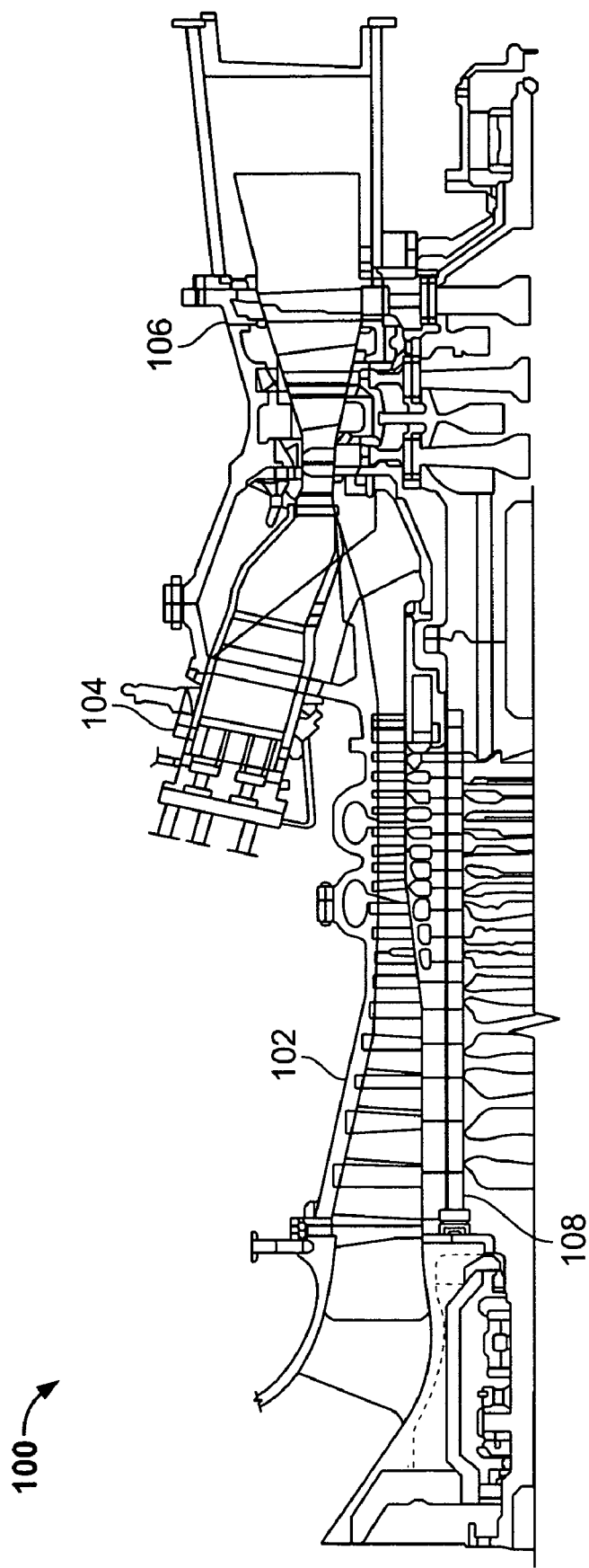
FIG. 1 is a schematic cross-sectional illustration of an exemplary gas turbine engine.

FIG. 1 is a schematic cross-sectional illustration of an exemplary gas turbine engine 100. Engine 100 includes a compressor assembly 102, a combustor assembly 104, a turbine assembly 106 and a common compressor/turbine rotor shaft 108. In one embodiment, engine 100 is a PG9351 FA engine commercially available from General Electric Company, Greenville, S.C. It should be noted that engine 100 is exemplary only, and that the present invention is not limited to engine 100 and may instead be implemented within any gas turbine engine that functions as described herein.

In operation, air flows through compressor assembly 102 and compressed air is discharged to combustor assembly 104. Combustor assembly 104 injects fuel, for example, natural gas and/or fuel oil, into the air flow, ignites the fuel-air mixture to expand the fuel-air mixture through combustion and generates a high temperature combustion gas stream. Combustor assembly 104 is in flow communication with turbine assembly 106, and discharges the high temperature expanded gas stream towards turbine assembly 106. The high temperature expanded gas stream imparts rotational energy to turbine assembly 106 and because turbine assembly 106 is rotatably coupled to rotor 108, rotor 108 subsequently provides rotational power to compressor assembly 102.

Figure 2:
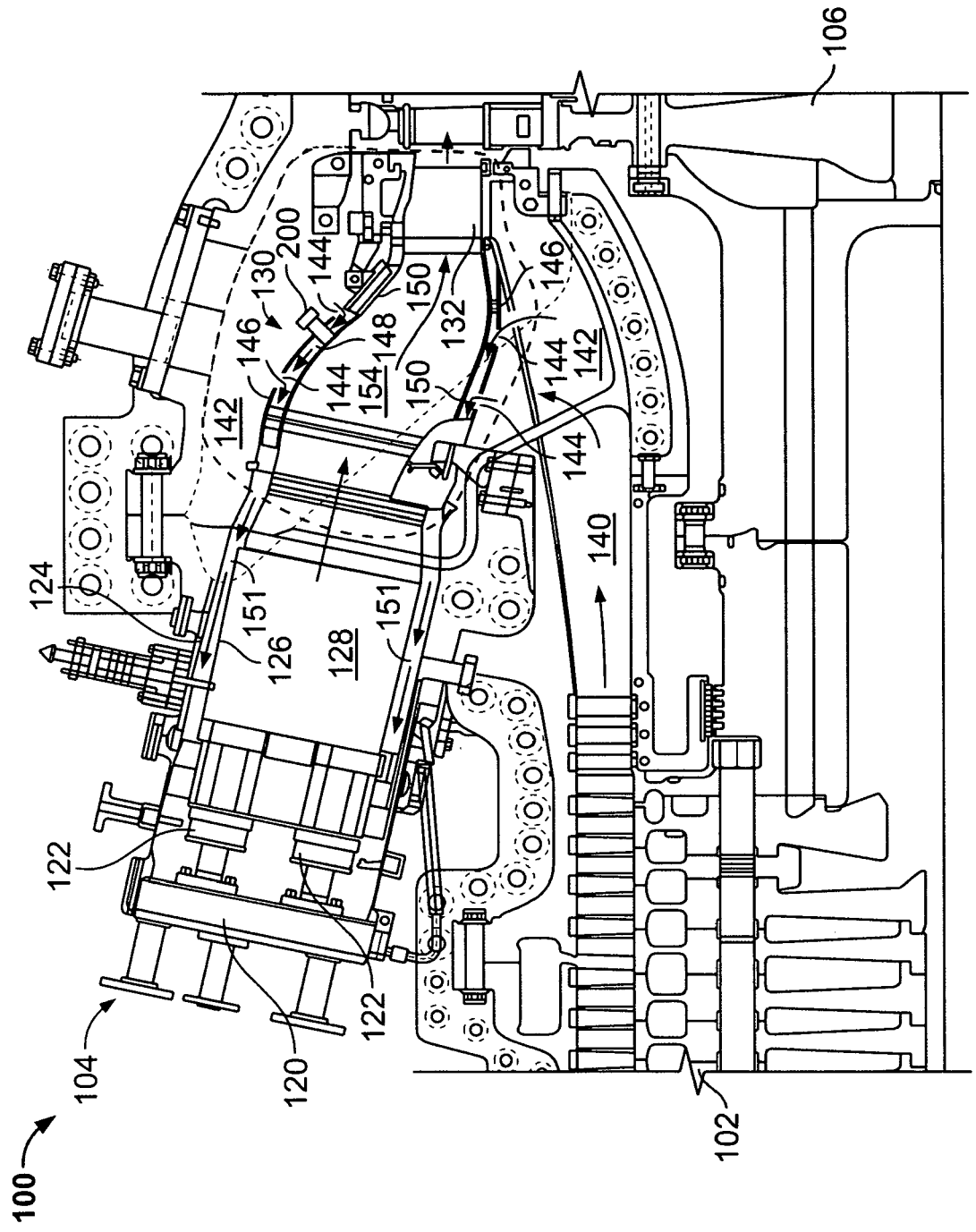
FIG. 2 is an enlarged cross-sectional illustration of a portion of an exemplary combustor assembly that may be used with the gas turbine engine shown in FIG. 1.

FIG. 2 is an enlarged cross-sectional illustration of a portion of an exemplary combustor assembly 104 that may be used with gas turbine engine 100 (shown in FIG. 1). Combustor assembly 104 is coupled in flow communication with turbine assembly 106. Combustor assembly 104 is also coupled in flow communication with compressor assembly 102. Compressor assembly 102 includes a diffuser 140 and a compressor discharge plenum 142, wherein both diffuser 140 and plenum 142 being coupled to each other in flow communication facilitate channeling air to combustor assembly 104 as discussed further below.

In the exemplary embodiment, combustor assembly 104 includes a substantially circular dome plate 120 that provides at least partial support to a plurality of fuel nozzles 122. Dome plate 120 is coupled to a substantially cylindrical and annular combustor casing 124 with retention hardware (not shown in FIG. 2). A substantially cylindrical combustor liner 126 is positioned within casing 124 and is supported via casing 124. A substantially cylindrical combustor chamber 128 is defined by liner 126. An annular combustion chamber cooling passage 151 is defined between combustor casing 124 and combustor liner 126.

A transition portion 130, often referred to as a transition piece 130, is coupled to combustor casing 124 and facilitates channeling combustion gases generated in chamber 128 to turbine nozzle 132. In the exemplary embodiment, transition piece 130 has a plurality of openings 144 formed in an outer wall 146. Piece 130 also has an annular passage 148 defined between an inner wall 150 and outer wall 146. Inner wall 150 defines a combustion gas stream guide cavity 154. Transition piece 130 also has an air control system 200, often referred to as an air staging system 200, which is discussed in more detail below.

In operation, compressor assembly 102 is driven by turbine assembly 106 via common shaft 108 (shown in FIG. 1). As compressor assembly 102 rotates, it compresses air and discharges compressed air into diffuser 140 as the associated arrows illustrate. In the exemplary embodiment, the majority of air discharged from compressor assembly 102 is channeled through compressor discharge plenum 142 towards combustor assembly 104, and a smaller portion of the compressed air is channeled downstream for use in cooling engine 100 components. More specifically, the pressurized compressed air within plenum 142 is channeled into transition piece 130 via openings 144 in outer wall 146 of transition piece 130 and into passage 148. Air is then channeled upstream from transition piece annular passage 148 into annular combustion chamber cooling passage 151. Air is discharged from passage 151 and channeled into fuel nozzles 122.

Fuel and air are mixed and ignited within combustion chamber 128. Casing 124 facilitates isolating combustion chamber 128 and its associated combustion processes from the outside environment, for example, surrounding turbine components. The resultant combustion gases are channeled from chamber 128 toward and through transition piece combustion gas stream guide cavity 154 that channels the combustion gas stream towards turbine nozzle 132. Area 3 is enlarged and discussed in more detail below.

Figure 3:
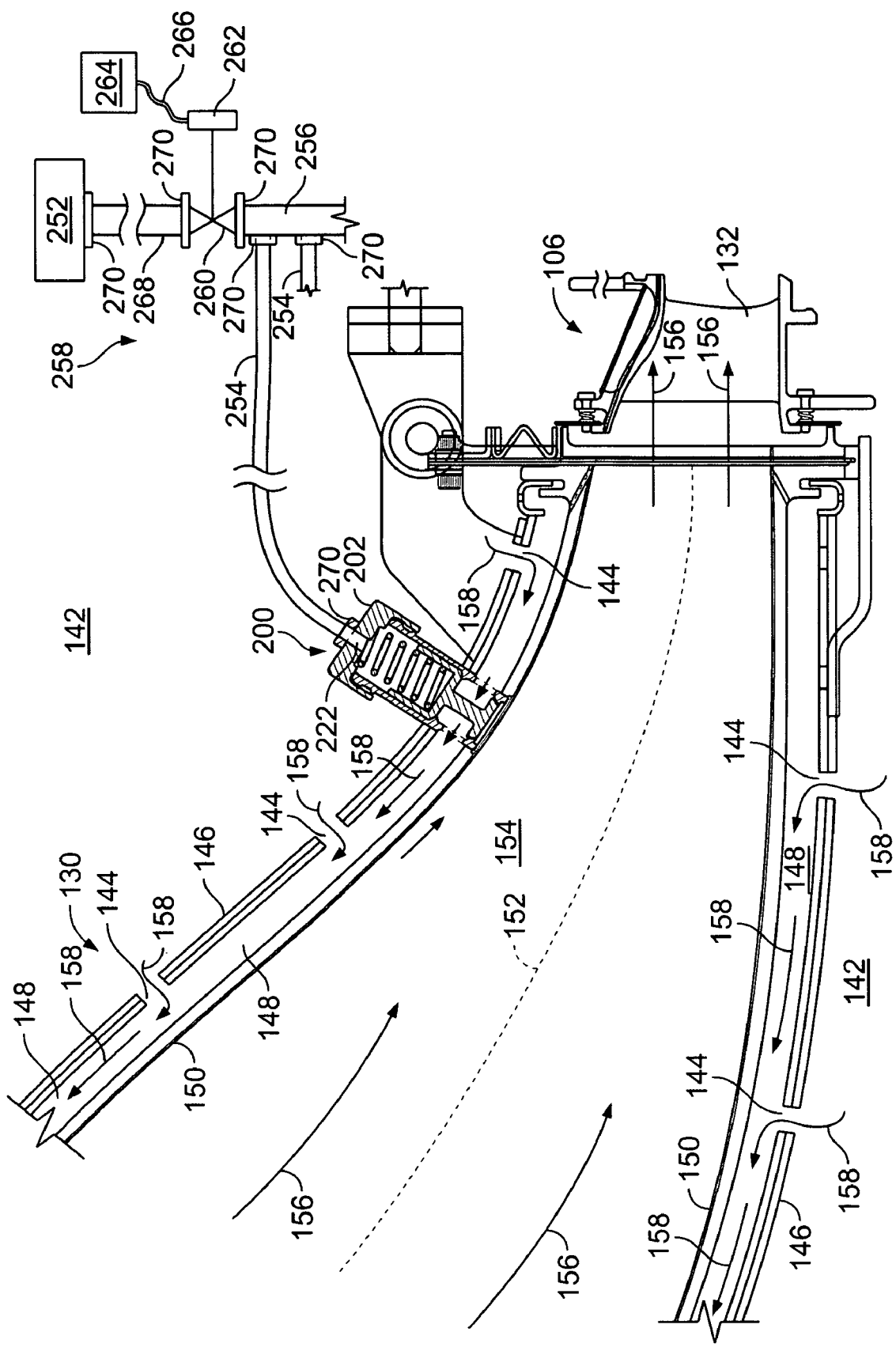
FIG. 3 is an enlarged cross-sectional illustration of an exemplary transition piece that may be used with the combustor assembly shown in FIG. 2.

FIG. 3 is an enlarged cross-sectional illustration of an portion of transition piece 130 taken along area 3 of FIG. 2 and including an exemplary air staging system 200. FIG. 4 is an enlarged cross-sectional illustration of air staging system 200. FIG. 5 is a cross-sectional illustration of a portion of air staging system 200 taken along Line A-A shown in FIG. 4. As described above, transition piece 130 is in coupled in flow communication with combustor assembly 104 and receives the combustion gases discharged from combustion chamber 128. Transition piece outer wall 146 and inner wall 150 are each substantially annular and each is aligned substantially concentrically with respect to a centerline 152 extending through transition piece 130. For the remainder of the discussion, radial directions are discussed with respect to centerline 152. Inner wall 150 partially defines a combustion gas stream guide cavity 154 that facilitates channeling combustion gases 156 from combustion chamber 128 towards turbine nozzle 132. Outer wall 146 and inner wall 150 cooperate to form passage 148. Passage 148 facilitates channeling combustion air 158 received from compressor discharge plenum 142 through openings 144 to fuel nozzles 122 (shown in FIG. 2). Moreover, flow 158 through passage 148 facilitates cooling wall 150 as air is preheated prior to reaching combustion chamber 128.

Air staging system 200 includes an enclosure 202. In the exemplary embodiment, enclosure 202 is substantially cylindrical. However, enclosure 202 may be any shape that facilitates the operation of system 200, for example, enclosure 202 may be, but is not limited to being, elliptically- or rectangularly-shaped. In the exemplary embodiment, enclosure 202 includes a substantially cylindrical circumferential wall 204 and an enclosure cap 206. Wall 204 has a radially inner surface 208, a radially outer surface 210, and a threaded portion 212. Cap 206 includes a radially inner surface 214, a threaded portion 216, and a threaded protrusion 218. In the exemplary embodiment, wall 204 and cap 206 are coupled together with threaded coupling portions 212 and 216, respectively. As such, cap 206 facilitates providing access to system 200 for maintenance activities. Alternatively, wall 204 and cap 206 may be coupled together using any other coupling means, such as, but not limited to, brazing or welding.

Inner surface 208 and radially inner surface 214 define a cavity 220 within enclosure 202. A cap passage 222 extends through cap 206 into flow communication with cavity 220. Specifically, passage 222 extends through cap 206 from radially inner surface 214 through protrusion 218.

In the exemplary embodiment, wall 204 includes a radially outermost surface 224 that contacts cap radially inner surface 214. Wall 204 is also formed with a radially outer seat 226, and a radially inner seat 228. Moreover, wall 204 also defines annular air open passage 230. Passage 230 facilitates enabling air flow 158 to flow through passage 148 and facilitates pressurization of cavity 220. Radially inner seat 228 defines an annular passage 232 that facilitates flow communication between air stream flow 158 and gas stream flow 156. Air staging system 200 also includes a biasing mechanism 236 and a piston 238 positioned within enclosure cavity 220. In the exemplary embodiment, mechanism 236 is a spring that is positioned such that a force induced in spring 236 is increased as spring 236 is compressed. In the exemplary embodiment, spring 236 is a straight spring. Alternatively, spring 236 may be, but is not limited to being a helical spring or a straight/helical combination spring. Biasing mechanism 236 has a radially outer end 240 and a radially inner end 242.

Piston 238 includes a substantially cylindrical portion 244, a radially inner portion 246, and a radially outer portion 248. Portion 244 extends integrally between portions 246 and 248. Portion 246 functions similarly to a valve disk and includes an annular seating surface 250 that may contact seat 228. Radially outer portion 248 includes a biasing mechanism seating surface 249 that contacts mechanism radially inner end 242. Portion 248 also includes radially inner surface 251 that is shaped to mate against seat 226. A radially outermost surface 253 of portion 238 may contact surface 214 to limit travel of piston 238.

In the exemplary embodiment, a plurality of enclosures 202 are spaced circumferentially about combustor assembly 104 to form system 200, although only one enclosure 202 is illustrated in FIGS. 3 and 4. The exact number of enclosures 202 is based at least partially on the application and upon parameters that may include, but are not limited to including space limitations with respect to combustor assemblies 104, operational clearances necessary with combustor assemblies, combustion gas stream 156 temperature profiles, and operating ranges of the associated engine 100.

System 200 is coupled to a low pressure fluid source 252 via cap passage 222. More specifically, a low pressure fluid conduit 254 extends between source 252 and a control mechanism 258, herein referred to as a controller assembly 258. Controller assembly 258 includes at least one low pressure fluid manifold 256 that is coupled in flow communication to a control valve 260, a valve operator 262 (sometimes referred to as an actuator), an automated valve control sub-system 264, and a valve control signal conduit 266. Controller assembly 258 also includes a low pressure fluid conduit 268 that is coupled in flow communication to source 252. In the exemplary embodiment low pressure fluid source 252 is a gas turbine exhaust duct (not shown in FIG. 3 or 4). Alternatively, source 252 may be a collection tank (not shown in FIGS. 3 and 4). In the exemplary embodiment, low pressure fluid manifold 256 includes a plurality of threaded couplings 270 that facilitate establishing flow communication between fluid conduits 254 and valve 260. Although only one valve 260 is illustrated, as will be appreciated by one skilled in the art, a plurality of valves 260 and/or a plurality of manifolds 256 may be included. In the exemplary embodiment, valve 260 and control sub-system 264 are configured to cooperate to facilitate a predetermined flow rate from enclosures 202 to source 252. Alternatively, valve 260 may be any device that can modulate the fluid flow rate to enable system 200 to function as discussed herein. In some configurations automated valve control sub-system 264 may include one or more microcontrollers to facilitate system monitoring and control operations including, but not limited to valve opening and closing operations and fault monitoring. Alternatively, distributed or centralized control architectures may be used in alternate embodiments of system 200.

System 200 is at least partially fabricated by casting, or using any suitable process for forming, circumferential wall 204 and piston 238 and machining both, as desired, to within predetermined tolerances. Piston 238 is inserted into cavity 220 such that piston surface 251 is in contact with seat 226, and piston seating surface 250 is in contact with seat 228 or almost in contact based on fabrication tolerances, and such that biasing mechanism 236 contacts surface 249 and is positioned within piston portion 248. Cap 206 is coupled to enclosure 202 until cap surface 214 contacts wall 204 such that biasing mechanism radially outer end 240 contacts radially inner surface 214 and mechanism 236 is biased to induce a radially inward closing force that biases piston 238 towards the "closed" position.

As shown in FIG. 5, passage 232 is circumferentially enclosed by seat 228.

In the exemplary embodiment, transition piece 130 is fabricated by casting, or using any suitable process for forming piece 130, using a material that meets or exceeds predetermined operation parameters. A plurality of open passages dimensioned to receive a plurality of enclosures 202 are formed in transition piece walls 146 and 150. Each enclosure 202, biasing mechanism 236 and piston 238 is then inserted into the passages in walls 146 and 148 and positioned such that seat 228 is slightly recessed and open passages 230 are circumferentially oriented within combustor air passage 148 to receive a predetermined portion of combustor air stream flow 158. In the exemplary embodiment, each enclosure 202 is fixedly secured to outer wall 150 using welding techniques known in the art. Alternatively, other coupling means may include, but are not limited to, brazing techniques or mechanical fasteners.

During operation of engine 100, at the higher end of the rated load band, substantially all of combustion air stream flow 158 discharged from compressor discharge plenum 142 is directed to combustor assembly 104. Moreover, high temperature combustion gas stream 156 is channeled from combustor assembly 104 to turbine assembly 106 and at least a portion of combustion air stream 158 flows into cavity 220 to facilitate pressurizing cavity 220. Tolerances between surface 251 and seat 226 are such that combustion air flow past seat 226 is mitigated. More specifically, tolerances between piston seating surface 250 and seat 228 are such that combustion air flow 158 radially inward past piston portion 246 is mitigated while seating surface 251 and seat 226 are in contact with each other, i.e., piston 238 is in the closed position. Biasing mechanism 236 biases piston 238 to remain in the closed position.

As load on engine 100 is decreased, the rate fuel input may decrease to a level wherein a combustion premix flame is unstable. As alternate combustion is employed, such as diffusion flame, the potential for $NO_x$ formation may increase. Control sub-system 264 contains predetermined algorithms that determine valve 260 position based on, but not limited to engine 100 load, combustion gas stream temperature, fuel flow rate, and/or combustion air flow rate. Control sub-system 264 is coupled in communication with valve operator 260 via valve control signal conduit 266 and transmits a signal to operator 262 to at least partially open valve 260. Because, air pressure in manifold 256 is greater than the operating pressure of fluid source 252, air flows from manifold 256 toward source 252.

The resultant drop in operating pressure within cavity 220 unbalances the previously static condition. Air 158 entering cavity 220 via open passage 230 acts on piston inner portion surface 251 and creates a differential pressure across surfaces 249 and 251 that forces piston 238 radially outward against biasing mechanism 236. Piston portion 248 is slidingly engaged with radially inner surface 208 and surface 208 facilitates guiding piston portion 248 into alignment relative to enclosure 202. This movement separates piston surface 251 from seat 226 and piston seating surface 250 from seat 228 such that the cooler combustion air 158 enters passage 232 and mixes with combustion gas stream 156. The introduction of combustion supply air 158 facilitates reducing the temperature of gas stream 156 and reducing the amount of combustion air 158 admitted to fuel nozzles 122 (shown in FIG. 2). As piston 238 moves radially outward and combustion air flows through passage 232, the rate of change of air pressure in cavity 220 is reduced which decreases the travel of piston 238 until system 200 once again attains a substantially static condition with at least a portion of combustion air flowing from cavity 220 to low pressure fluid source 252 or piston 238 travel will be limited when piston radially outward end 253 is in contact with surface 214.

In the event of a increase in engine 100 load while piston 238 is in the open position, valve 260 will move toward the closed position and the pressure differential across surfaces 249 and 251 will decrease. During this same time period, the bias of mechanism 236 will cause piston 238 to move radially inward, thereby decreasing the rate of air flow into guide cavity 154 via passage 232. Further changes in engine 100 load will further modulate valve 260 to move piston 238 toward the open or closed position.

Figure 6:
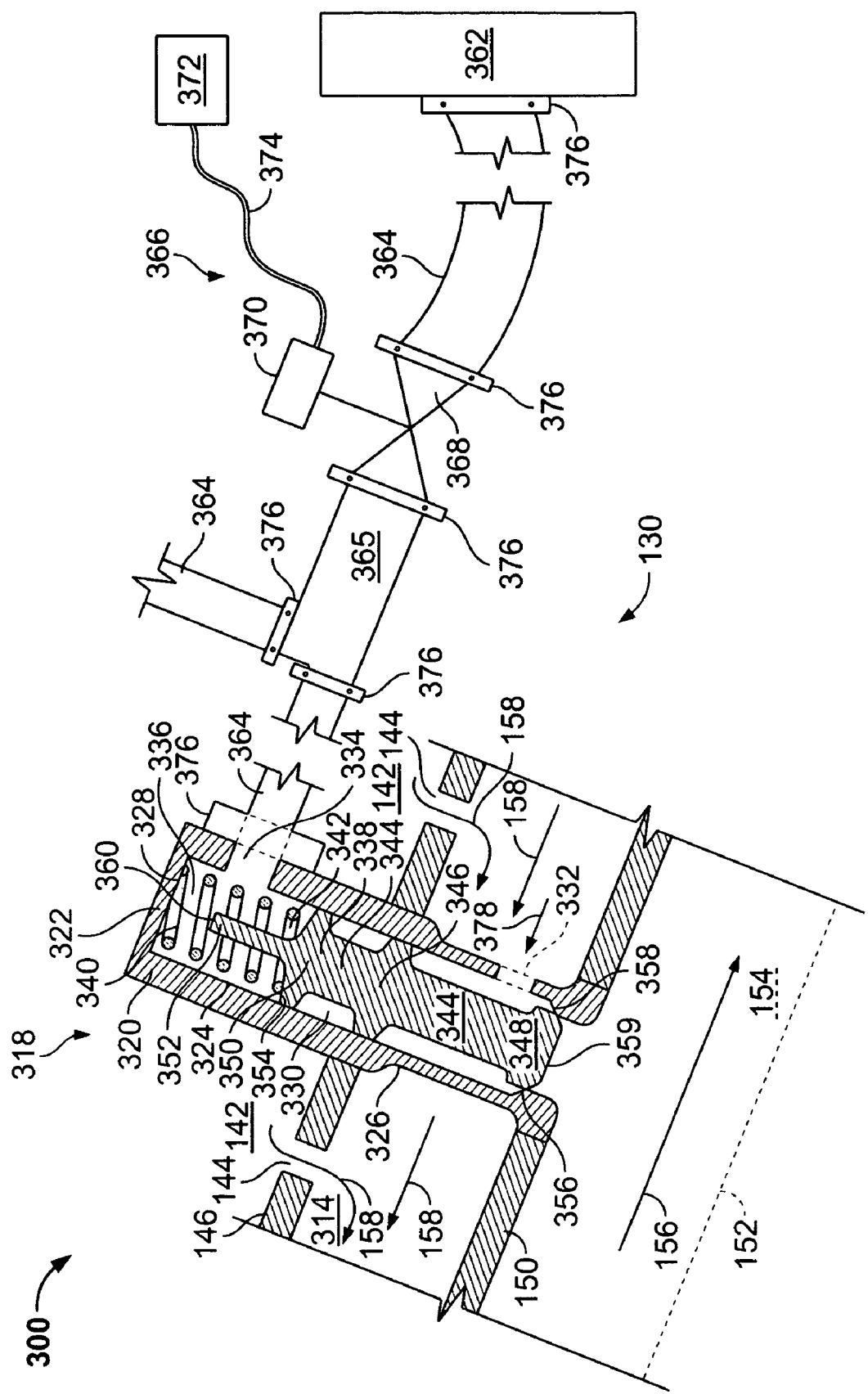
FIG. 6 is a cross-sectional illustration of an alternative embodiment of an air staging system that may be used with the combustor assembly shown in FIG. 2.

FIG. 6 is a cross-sectional illustration of an alternative embodiment of an air staging system 300 that may be used with combustor assembly 104 (shown in FIG. 2). As described above, transition piece 130 is in coupled in flow communication with combustor assembly 104 and receives the combustion gases discharged from combustion chamber 128. Transition piece outer wall 146 and inner wall 150 are each substantially annular and each is aligned substantially concentrically with respect to a centerline 152 extending through transition piece 130. For the remainder of the discussion, radial directions are discussed with respect to centerline 152. Inner wall 150 partially defines a combustion gas stream guide cavity 154 that facilitates channeling combustion gases 156 from combustion chamber 128 towards turbine nozzle 132. Outer wall 146 and inner wall 150 cooperate to form passage 148. Passage 148 facilitates channeling combustion air 158 received from compressor discharge plenum 142 through openings 144 to fuel nozzles 122 (shown in FIG. 2). Moreover, flow 158 through passage 148 facilitates cooling walls 150 as air is preheated prior to reaching combustion chamber 128.

Air staging system 300 includes an enclosure 318. In the exemplary embodiment, enclosure 318 is substantially cylindrical. However, enclosure 318 may be any shape that facilitates the operation of system 300, for example, enclosure 318 may be, but is not limited to being, elliptically- or rectangularly-shaped. In the exemplary embodiment, enclosure 318 includes a substantially cylindrical circumferential wall 320 and a radially outermost wall 322. Wall 320 includes a radially inner surface 324 and a radially outer surface 326. Wall 322 includes a radially inner surface 328. In the alternative embodiment, walls 320 and 322 are coupled with a threaded coupling mechanism (not shown in FIG. 6) As such, wall 322 facilitates providing access to system 300 for maintenance activities. Alternatively, walls 320 and 322 may be coupled together using any other coupling means, such as, but not limited to, brazing or welding. Inner surface 324 defines enclosure cavity 330 in cooperation with radially inner surface 328. Wall 320 defines a substantially circular radially inner combustion supply air passage 332 and a substantially circular radially outer low pressure fluid connection passage 334.

Air staging system 300 also includes a biasing mechanism 336 and a piston 338 positioned within enclosure cavity 330. In the alternative embodiment, mechanism 336 is a spring that is positioned such that a force induced in spring 336 is increased as spring 336 is compressed. In this alternative embodiment, spring 336 is a straight spring. Alternatively, spring 336 may be, but is not limited to being a helical spring or a straight/helical combination spring. Biasing mechanism 336 has a radially outer end 340 and a radially inner end 342.

Piston 338 includes a plurality of substantially cylindrical portions 344 that are integral to and bifurcated by at least one radially intermediate circumferential protrusion 346, a radially innermost circumferential protrusion 348, a radially outermost circumferential protrusion 350, and a radially elongated protrusion 352 extending radially outward from a protrusion 350 radially outermost surface 354 into the center of biasing mechanism 336. Surface 354 is also a biasing mechanism seating surface that receives radially inner biasing mechanism end 342. Radially outer biasing mechanism end 340 is received by surface 328. Protrusion 348 functions similarly to a valve disk and includes an annular seating surface 356 that is shaped to mate against a radially inner seat 358. Surface 356 defines passage 359. A radially outermost surface 360 of protrusion 352 may contact surface 328 to limit travel of piston 338.

In the alternative embodiment, a plurality of enclosures 318 are spaced circumferentially about combustor assembly 104 to form system 300, although only one enclosure 318 is illustrated in FIG. 6. The exact number of enclosures 318 and contents is based at least partially on the application and upon parameters that may include, but are not limited to including space limitations with respect to combustor assemblies 104, operational clearances necessary with combustor assemblies, combustion gas stream 156 temperature profiles, and operating ranges of the associated engine 100.

System 300 is coupled to a low pressure fluid source 362 via cap passage 334. More specifically, a low pressure fluid conduit 364 extends between source 362 and a controller assembly 366. Controller assembly 366 includes at least one low pressure fluid manifold 365 that is coupled in flow communication to a control valve 368, a valve operator 370 (sometimes referred to as an actuator), an automated valve control sub-system 372, and a valve control signal conduit 374. Controller assembly 366 also includes a low pressure fluid conduit 364 that is coupled in flow communication to source 362. In the exemplary embodiment low pressure fluid source 362 is a gas turbine exhaust duct (not shown in FIG. 6). Alternatively, source 362 may be a collection tank (not shown in FIG. 6). In the alternate embodiment, low pressure fluid manifold 365 includes a plurality of threaded couplings 376 that facilitate establishing flow communication between fluid conduits 364 and valve 368. Although only one valve 368 is illustrated, as will be appreciated by one skilled in the art, a plurality of valves 368 and/or a plurality of manifolds 365 may be included. In the alternative embodiment, valve 368 and control sub-system 372 are configured to cooperate to facilitate a predetermined flow rate from enclosures 318 to source 362. Alternatively, valve 368 may be any device that can modulate the fluid flow rate to enable system 300 to function as discussed herein. In some configurations automated valve control sub-system 372 may include one or more microcontrollers to facilitate system monitoring and control operations including, but not limited to valve opening and closing operations and fault monitoring. Alternatively, distributed or centralized control architectures may be used in alternate embodiments of system 300.

System 300 is at least partially fabricated by casting, or any other suitable process for forming, circumferential wall 320 and a piston 338, machining both, as desired, to within predetermined tolerances, inserting piston 338 into cavity 330 such that seating surface 356 is in contact with seat 358, and such that biasing mechanism 336 contacts surface 354 and protrusion 352 extends through the center of biasing mechanism 336. Wall 322 is coupled to wall 320 by the threaded coupling mechanism (not shown in FIG. 6) such that biasing mechanism radially outer end 340 contacts radially inner surface 328 and mechanism 336 is biased to induce a radially inward closing force that biases piston 338 towards the "closed" position.

In this alternative embodiment, transition piece 130 is fabricated by casting, or using any suitable process for forming piece 130, using a material that meets or exceeds predetermined operation parameters. A plurality of open passages dimensioned to receive a plurality of enclosures 318 are formed in transition piece walls 146 and 150. Each enclosure 318 biasing mechanism 336 and piston 338 is then inserted into the open passages in walls 146 and 150 and positioned such that a radially innermost portion of enclosure 318 is flush with a radially innermost portion of wall 150 and passage 332 is circumferentially oriented within combustor air open passage 314 to receive a predetermined portion of combustor air stream flow 378. In this alternative embodiment, each enclosure 318 is fixedly secured to outer wall 304 using welding techniques known in the art. Alternatively, other coupling means may include, but are not limited to, brazing techniques or using mechanical fasteners.

During operation of engine 100, at the higher end of the rated load band, substantially all of combustion air stream flow 158 discharged from compressor discharge plenum 142 is directed to combustor assembly 104. Moreover, high temperature combustion gas stream 156 is channeled from combustor assembly 104 to turbine assembly 106 and at least a portion of combustion air stream 158 flows into cavity 330 to facilitate pressurizing cavity 330. Tolerances between protrusion 346 and circumferentially inner surface 324 are such that combustion air flow past protrusion 346 is mitigated. More specifically, tolerances between seating surfaces 356 and 358 are such that combustion air flow 158 past protrusion 348 is mitigated while seating surfaces 356 and 358 are in contact with each other, i.e., piston 338 is in the closed position. Biasing mechanism 336 biases piston 338 to remain in the closed position.

As load on engine 100 is decreased the rate of fuel input may decrease to a level wherein a combustion premix flame is unstable. As alternate combustion is employed, such as diffusion flame, the potential for $NO_x$ formation may increase. Control sub-system 372 contains predetermined algorithms that determine valve 368 position based on, but not limited to engine 100 load, combustion gas stream temperature, fuel flow rate, and combustion air flow rate. Control sub-system 372 is coupled in communication with valve operator 370 via valve control signal conduit 374 and transmits a signal to operator 370 to at least partially open valve 368. Because air pressure in manifold 365 is greater than the operating pressure of fluid source 362, air flows from manifold 365 toward source 362.

The resultant drop in operating pressure within cavity 330 unbalances the previously static condition. Air 378 entering cavity 330 via open passage 332 acts on the radially inner portion of protrusion 346 and creates a differential pressure across protrusion 346 that forces piston 338 radially outward against biasing mechanism 336 bias. Piston protrusions 346 and 350 are slidingly engaged with radially inner surface 324 and surface 324 facilitates guiding piston protrusions 346 and 350 into alignment relative to enclosure 318. This movement separates seating surfaces 356 from 358 such that the combustion supply air 158 is allowed to enter open passage 359 and mixes with combustion gas stream 156. The introduction of combustion air 158 facilitates reducing the temperature of gas stream 156 and reducing the amount of air admitted to fuel nozzles 122 (shown in FIG. 2). As piston 338 moves radially outward and combustion air flows through passage 359, the rate of change of air pressure in cavity 330 is reduced which decreases the travel of piston 338 until system 300 once again attains a substantially static condition.

In the event of an increase in engine 100 load while piston 338 is in the open position, valve 368 will move toward the closed position, and the pressure differential across protrusion 346 will decrease. During this same time period, the bias of mechanism 336 will cause piston 338 to move radially inward, thereby decreasing the rate of air flow into guide cavity 154 via passage 359. Further changes in engine 100 load will further modulate valve 368 to move piston 338 toward the open or closed position.

The methods and apparatus for a fabricating a combustor assembly described herein facilitate operation of a turbine system. More specifically, the combustor assembly as described above facilitates a wider range of operation in premix flame mode, which is lower in $NO_x$ emissions.

Exemplary embodiments of combustor assemblies as associated with turbine systems are described above in detail. The methods, apparatus and systems are not limited to the specific embodiments described herein nor to the specific illustrated combustor assembly.

While the invention has been described in terms of various specific embodiments, those skilled in the art will recognize that the invention can be practiced with modification within the spirit and scope of the claims.

What is claimed is:

1. A method of assembling a gas turbine engine including at least one combustor, said method comprising:
   coupling at least one transition portion to the at least one combustor and to at least one gas turbine nozzle such that the at least one transition portion facilitates channeling combustion gases discharged from the at least one combustor to the at least one gas turbine nozzle;
   defining a downstream combustion gas flow channel within the at least one transition portion;
   defining a substantially annular upstream airflow channel that is spaced substantially circumferentially about the downstream flow channel and located within a plenum;
   providing at least one air control system including at least one biasing mechanism and at least one piston coupled to a control mechanism;
   forming at least one seat within an opening defined in the at least one transition portion, wherein the opening extends between the downstream flow channel and the upstream flow channel, the seat configured to limit movement of the at least one piston; and
   coupling the air control system to the at least one transition portion to facilitate combustion during engine operation.

2. A method in accordance with claim 1 wherein coupling the air control system to at least one transition portion comprises coupling the air control system to at least one transition portion extending between the at least one combustor and a turbine assembly such that the biasing mechanism is biased against the piston within an enclosure that is coupled to a low pressure fluid source.

3. A method in accordance with claim 2 wherein coupling the air control system to at least one transition portion comprises:
   aligning the biasing mechanism and the piston substantially concentrically with respect to the opening defined in the at least one transition portion; and
   biasing the piston to selectively control a flow of air into the at least one combustor through the opening defined in the at least one transition portion.

4. A method in accordance with claim 3 wherein biasing the piston to selectively control a flow of air into the at least one combustor further comprises positioning the piston against the seat formed within the opening defined in the at least one transition portion.

5. A method of assembling a gas turbine engine in accordance with claim 3 wherein coupling the air control system to at least one transition portion further comprises coupling a plurality of air control systems circumferentially about the at least one transition portion.

6. A method of assembling a gas turbine engine in accordance with claim 3 wherein biasing the piston comprises positioning the biasing mechanism to bias the piston radially inward.

7. A method of assembling a gas turbine engine in accordance with claim 1 wherein coupling the air control system to at least one combustor further comprises coupling the control mechanism to the biasing mechanism to selectively control the flow of air into the at least one combustor based on gas turbine engine operating conditions.

8. A combustor assembly comprising:
a combustion chamber;
a gas turbine nozzle;
at least one transition portion extending downstream from said combustion chamber to said gas turbine nozzle, said at least one transition portion facilitates channeling combustion gases from said combustion chamber to said gas turbine nozzle, wherein said transition portion defines a downstream combustion gas flow channel and a substantially annular upstream airflow channel that is spaced substantially circumferentially about said downstream flow channel and located within a plenum, and at least one seat formed within an opening defined in said at least one transition portion, wherein said opening extends between said downstream and upstream flow channels; and
at least one air control system coupled to said at least one transition portion, said air control system comprising at least one biasing mechanism and at least one piston coupled to a controller, said at least one seat configured to limit the movement of said at least one piston.

9. A combustor assembly in accordance with claim 8 wherein said transition portion comprises a plurality of walls defining said transition portion, at least one of said plurality of walls comprises the opening extending therethrough, said opening facilitates a reduction of emissions from said combustor assembly.

10. A combustor assembly in accordance with claim 9 wherein said at least one air control system comprises at least one piston enclosure, said enclosure is coupled in flow communication with said transition portion and at least one low pressure fluid source, said enclosure houses at least a portion of said biasing mechanism and at least a portion of said at least one piston, said biasing mechanism is aligned substantially concentrically with respect to said opening defined in said transition portion.

11. A combustor assembly in accordance with claim 10 wherein said at least one air control system enclosure comprises an outer wall comprising a plurality of passages defined therein, wherein a first of said plurality of passages is coupled in flow communication with a high pressure fluid source, a second of said plurality of passages is coupled in flow communication with a combustion gas stream passage, and a third of said plurality of passages is coupled in flow communication with a low pressure fluid source.

12. A combustor assembly in accordance with claim 10 wherein said piston comprise a radially inner portion, a radially outer portion, and a center portion extending therebetween, said center portion having a diameter that is smaller than a diameter of said radially outer and radially inner portions.

13. A combustor assembly in accordance with claim 10 wherein said biasing mechanism biases said piston, said biasing mechanism positioned between an interior wall of said air control system enclosure and said piston.

14. A combustor assembly in accordance with claim 8 wherein said at least one control mechanism comprises at least one valve coupled between a low pressure fluid source and said at least one biasing mechanism for controlling a flow of air into said combustor during engine operation.

15. A gas turbine engine comprising:
a compressor,
at least one combustor assembly downstream from said compressor and comprising a combustion chamber, a gas turbine nozzle, and at least one transition portion extending downstream from said combustion chamber to said gas turbine nozzle to facilitate channeling combustion gases from said combustion chamber to said gas turbine nozzle, said transition portion defines a downstream combustion gas flow channel and a substantially annular upstream airflow channel that is spaced substantially circumferentially about said downstream flow channel and located within a plenum, and at least one seat formed within an opening defined in said at least one transition portion, said opening extends between said downstream and upstream flow channels; and
at least one air control system coupled to said at least one transition portion, said air control system comprising at least one biasing mechanism and at least one piston coupled to a controller, said at least one seat configured to limit the movement of said at least one piston.

16. A gas turbine engine in accordance with claim 15 wherein said combustor assembly transition portion comprises at least one wall defining a flow boundary of said transition portion, said transition portion at least one wall comprises the at least one opening defined therein, said opening facilitates reducing emissions from said combustor assembly during engine operations.

17. A gas turbine engine in accordance with claim 16 wherein said combustor assembly at least one air control system comprises at least one enclosure, said enclosure is coupled in flow communication with at least one transition portion opening and with at least one low pressure fluid source, said enclosure houses at least a portion of said biasing mechanism and at least a portion of said piston, said biasing mechanism is aligned substantially concentrically with respect to at least one transition portion opening and with respect to said at least one piston.

18. A gas turbine engine in accordance with claim 17 wherein said combustor assembly at least one air control system enclosure comprises a plurality of openings, a first of said openings is coupled in flow communication with a high pressure fluid source, and a second of said openings is coupled in flow communication with a low pressure fluid source.

19. A gas turbine engine in accordance with claim 17 wherein said piston and said biasing mechanism are in contact, said biasing mechanism further contacts said air control system enclosure.

20. A gas turbine engine in accordance with claim 15 wherein said at least one control mechanism comprises:
at least one valve coupled in flow communication to a low pressure fluid source to control a flow of air into said combustor during operation.

* * * * *

UNITED STATES PATENT AND TRADEMARK OFFICE
CERTIFICATE OF CORRECTION

| | | |
|---|---|---|
| PATENT NO. | : 7,631,504 B2 | Page 1 of 1 |
| APPLICATION NO. | : 11/358763 | |
| DATED | : December 15, 2009 | |
| INVENTOR(S) | : Keith Cletus Belsom | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 612 days.

Signed and Sealed this

Twenty-first Day of December, 2010

David J. Kappos
*Director of the United States Patent and Trademark Office*